(12) United States Patent
Jang et al.

(10) Patent No.: US 8,659,717 B2
(45) Date of Patent: Feb. 25, 2014

(54) LIQUID CRYSTAL DISPLAY

(75) Inventors: Nam-Jin Jang, Yongin (KR);
Young-Min You, Yongin (KR)

(73) Assignee: Samsung Display Co., Ltd. (KR)

( * ) Notice: Subject to any disclaimer, the term of this patent is extended or adjusted under 35 U.S.C. 154(b) by 378 days.

(21) Appl. No.: 13/014,094

(22) Filed: Jan. 26, 2011

(65) Prior Publication Data

US 2011/0310324 A1 Dec. 22, 2011

(30) Foreign Application Priority Data

Jun. 16, 2010 (KR) ........................ 10-2010-0057170

(51) Int. Cl.
*G02F 1/1333* (2006.01)
*G02F 1/1335* (2006.01)
(52) U.S. Cl.
CPC .................................... *G02F 1/1335* (2013.01)
USPC .............................................. 349/58; 349/65
(58) Field of Classification Search
CPC ....................................................... G02F 1/1335
USPC ..................................................... 349/58, 65
See application file for complete search history.

(56) References Cited

U.S. PATENT DOCUMENTS

| | | | | |
|---|---|---|---|---|
| 5,170,194 A | * | 12/1992 | Kurematsu et al. | 353/52 |
| 2007/0126335 A1 | * | 6/2007 | You et al. | 313/485 |
| 2007/0222912 A1 | * | 9/2007 | Sato et al. | 349/58 |
| 2010/0073582 A1 | * | 3/2010 | Konno et al. | 348/794 |
| 2010/0277664 A1 | * | 11/2010 | Kim et al. | 349/58 |

FOREIGN PATENT DOCUMENTS

| | | |
|---|---|---|
| KR | 10-1999-0050941 | 7/1999 |
| KR | 10-2006-0093956 | 8/2006 |
| KR | 10-0711872 | 4/2007 |
| KR | 10-0757794 | 9/2007 |
| KR | 10-2008-0028581 | 4/2008 |
| KR | 10-2008-0071363 | 8/2008 |
| KR | 10-2008-0098145 | 11/2008 |
| KR | 2020090002533 | 3/2009 |
| KR | 10-2009-0100147 | 9/2009 |

\* cited by examiner

*Primary Examiner* — Lucy Chien

(74) *Attorney, Agent, or Firm* — Knobbe Martens Olson & Bear LLP

(57) ABSTRACT

A liquid crystal display (LCD) that includes: an LCD panel; a backlight unit that includes a light source and a light guide plate; and a frame that houses the LCD panel and the backlight unit. The frame includes first support members that at least partially form opposing sides of the frame, and a first guide unit that includes protrusions that project inside the frame, to separate the LCD panel from the first support members.

15 Claims, 5 Drawing Sheets

LIQUID CRYSTAL DISPLAY

CROSS-REFERENCE TO RELATED APPLICATION

This application claims priority to and the benefit of Korean Patent Application No. 10-2010-0057170, filed in the Korean Intellectual Property Office on Jun. 16, 2010, the disclosure of which is incorporated herein, by reference.

BACKGROUND

1. Field

The described technology relates generally to a liquid crystal display (LCD). More particularly, the described technology relates generally to an LCD that can be formed to have a reduced thickness.

2. Description of the Related Art

As compared to a cathode ray tube (CRT), a liquid crystal display (LCD) has a reduced size, weight, and power consumption. As such, LCDs are widely used in small-sized devices, such as mobile phones, personal digital assistants (PDAs), and portable multimedia players (PMPs). In addition, LCDs are also applicable to medium and large-sized devices, such as computer monitors and televisions, due to the above characteristics.

In general, an LCD includes a liquid crystal display panel that forms an image by altering the optical properties of liquid crystal included therein, according to image data; a flexible printed circuit (FPC) including a driving circuit for driving the liquid crystal display panel; a backlight unit that provides light to the display panel; and a frame that houses the backlight unit and display panel.

Currently, thin display devices are in high demand. Thus, thinner frames for liquid crystal display panels are needed. However, when the thickness of a frame is reduced, the overall strength of an LCD may also be reduced.

Further, when a frame of an LCD is formed of a high-strength metal such as steel use stainless (SUS), a burr may occur when a liquid crystal display panel is inserted into such a frame. Since the liquid crystal display panel directly contacts the frame, the liquid crystal display panel may be weakened or damaged by such a burr.

In general, when assembling a liquid crystal display panel, a jig is used in order to prevent the liquid crystal display panel from leaning in one direction. As such, the entire assembly process may become complicated and time consuming, due to use of the jig.

The above information disclosed in this Background section is only for enhancement of understanding of the background of the described technology, and therefore, it may contain information that does not constitute prior art.

SUMMARY

The described technology has been made in an effort to provide an LCD having a slim profile and high structural stability.

An exemplary embodiment provides a liquid crystal display (LCD) including: a LCD panel; a backlight unit that includes a light source and a light guide plate that applies and diffuses light that is emitted from the light source; and a frame that houses the LCD panel and the backlight unit. The frame includes first support members that are formed along opposing sides of the frame, and a first guide unit to separate the LCD panel from the first support members.

According to various embodiments, a molding is not disposed between the LCD panel and the first support members.

According to various embodiments, the first guide unit may include projections that extend inside the frame and are disposed at opposing ends the first support members.

According to various embodiments, the first guide unit may have planar inward facing surfaces that extend parallel to the inwardly facing surfaces of the first support members.

According to various embodiments, the frame may further include: second support members disposed perpendicular to the first support members; and a second guide unit that covers inward facing surfaces of the second support members. The LCD panel may be housed in the frame, in contact with the second guide unit.

According to various embodiments, the second guide unit may form steps that extend in a direction parallel to the opposing surfaces of the second support members.

According to various embodiments, the second guide unit may be formed flat in a direction parallel to the opposing surfaces of the second support members.

According to various embodiments, a separation distance between the first support members and the LCD panel may be from about 0.1 mm to 0.3 mm.

According to various embodiments, the first support members may include one of steel use stainless (SUS), steel, chromium, and nickel, and the first guide unit may include a polycarbonate (PC).

According to various embodiments, the second support members may include one of SUS, steel, chromium, and nickel, and the second guide unit may include a PC.

According to various embodiments, the LCD may further include an optical sheet disposed between the LCD panel and the backlight unit.

According to various embodiments, the LCD may further include a reflection sheet disposed on the backlight unit.

According to an exemplary embodiment, an LCD can be formed to be slim.

Further, by suppressing strength deterioration of the LCD, structural stability can be secured.

Further, an assembly process of the LCD can be simplified, and a processing time can be shortened.

Additional aspects and/or advantages of the present disclosure will be set forth in part in the description which follows and, in part, will be obvious from the description, or may be learned by practice of the invention.

BRIEF DESCRIPTION OF THE DRAWINGS

These and/or other aspects and advantages of the present disclosure will become apparent and more readily appreciated from the following description of the exemplary embodiments, taken in conjunction with the accompanying drawings, of which.

DETAILED DESCRIPTION

Figure 1:
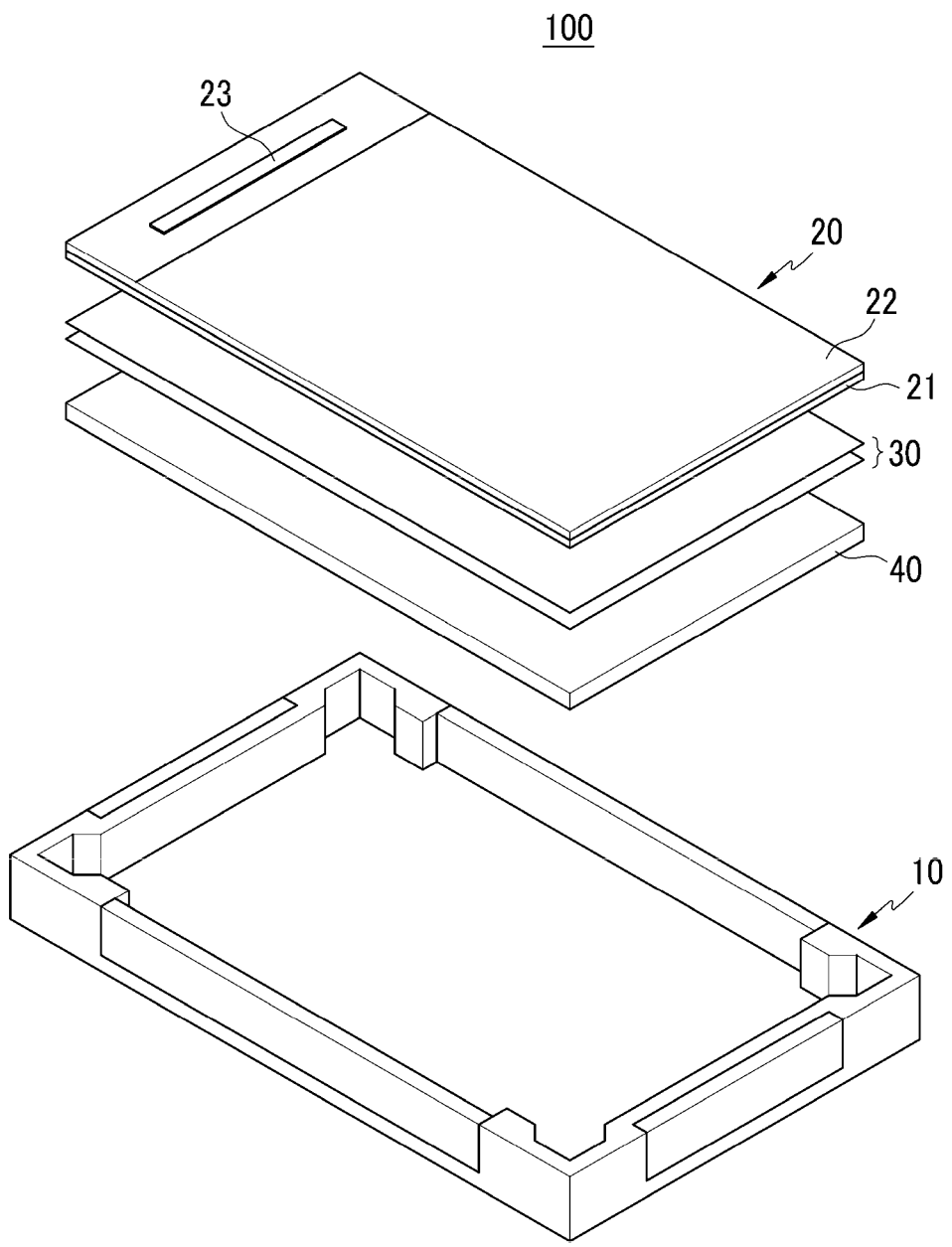
FIG. 1 is a schematic exploded perspective view illustrating an LCD, according to a first exemplary embodiment.

Reference will now be made in detail to the exemplary embodiments of the present disclosure, examples of which are illustrated in the accompanying drawings, wherein like reference numerals refer to the like elements throughout. The exemplary embodiments are described below, in order to explain the aspects of the present disclosure, by referring to the figures.

FIG. 1 is a schematic exploded perspective view illustrating an LCD 100, according to an exemplary embodiment of the present disclosure. The LCD 100 includes a liquid crystal display panel 20, a backlight unit, and a frame 10.

The liquid crystal display panel 20 includes a thin film transistor (TFT) panel 21 and a color filter panel 22 that are disposed opposite to each other. Liquid crystal (not shown) is injected between the panels 21 and 22. In this case, the TFT panel 21 and the color filter panel 22 are made of a material such as glass.

TFTs, capacitors, and pixel electrodes are formed in the TFT panel 21. A gate line and a data line are respectively connected to a gate electrode and a source electrode, and a pixel electrode is connected to a drain electrode, of each of the TFTs. The gate lines and the data lines are connected to a flexible printed circuit (FPC) (not shown), to input electrical signals to the FPC, whereby an electrical signal is input to the gate electrode and the source electrode of each TFT. The TFTs are turned on or turned off, according to the input electrical signal, and thus, an electrical driving signal is output to the drain electrodes.

A transparent common electrode, which is formed of a conductive transparent material such as indium tin oxide (ITO), and a color filter having RGB pixels, are formed in the color filter panel 22. Power is applied to the gate electrodes and the source electrodes of the TFTs, and if one of the TFTs is turned on, an electrical field is formed between a pixel electrode of the TFT panel 21 and the common electrode of the color filter panel 22. An alignment angle of liquid crystal is changed by the electric field, and light transmittance is changed according to the changed alignment angle. Thus, light emission from a desired pixel can be controlled.

An integrated circuit chip 23 is mounted on the TFT panel 21 to control the liquid crystal display panel 20. The integrated circuit chip 23 generates a plurality of timing signals, for applying a gate driving signal and a data driving signal at appropriate times. The integrated circuit chip 23 applies the timing signals to the gate lines and the data lines of the liquid crystal display panel 20.

In order to polarize light passing through the liquid crystal display panel 20, polarizing plates (not shown) may be attached to opposing surfaces of the liquid crystal display panel 20.

The liquid crystal display panel 20 includes a backlight unit. The backlight unit includes a light source (not shown) and a light guide plate 40 that diffuses light that is emitted from the light source. Light emitting diodes (LEDs) can be used as the light source, and may be mounted on a printing circuit film (not shown) disposed at a side surface of the light guide plate 40. Light sources of various intensities can be used, according to the size and use of the LCD 100. The light source may be disposed behind the light guide plate 40. Light that is emitted from the light source is applied to the light guide plate 40, and the light guide plate 40 diffuses the light, such that the light is uniformly emitted from the entire surface of the light guide plate 40.

An optical sheet 30 can be formed between the liquid crystal display panel 20 and the backlight unit. The optical sheet 30 may include a diffusion sheet, a prism sheet, a protective sheet, etc., and it allows light passing through the light guide plate 40 to be applied to the liquid crystal display panel 20, in a direction perpendicular to the liquid crystal display panel 20. Further, a reflection sheet (not shown) may be further formed behind the backlight unit. When a reflection sheet is formed, light that is emitted to a lower surface of the light guide plate 40 is reflected by the reflection sheet to be advanced, toward the optical sheet 30, thereby minimizing the loss of light.

The configuration of the liquid crystal display panel 20 and the backlight unit is not limited to the above-described configuration. In particular, various configurations that are well known to a person of ordinary skill in the art may be employed.

The liquid crystal display panel 20, the backlight unit, etc., are housed in the frame 10. The frame 10 includes a bottom portion and a circumferential edge portion, and the liquid crystal display panel 20 is guided by the circumferential edge portion of the frame 10 to be received on the bottom portion of the frame 10.

In the present exemplary embodiment, in order to form the LCD 100 to be slim, the frame 10 is formed by integrally forming a mold and support members, and hereinafter, the structure of the frame 10 will be described in detail with reference to FIGS. 2 and 3.

Figure 2:
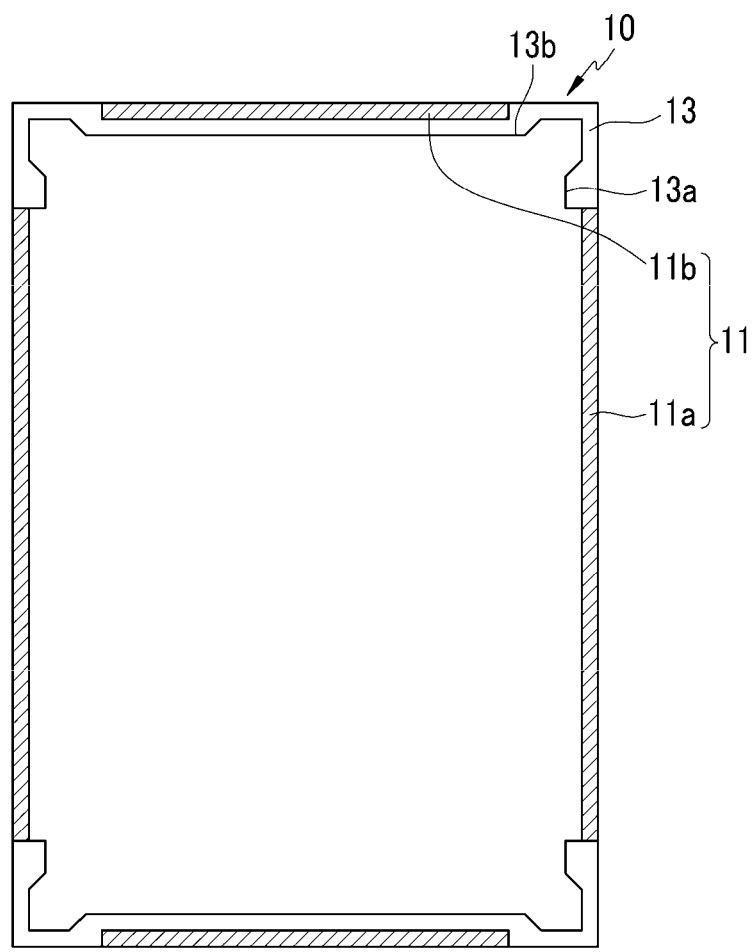
FIG. 2 is a top plan view illustrating a frame of the LCD of FIG. 1.
Figure 3:
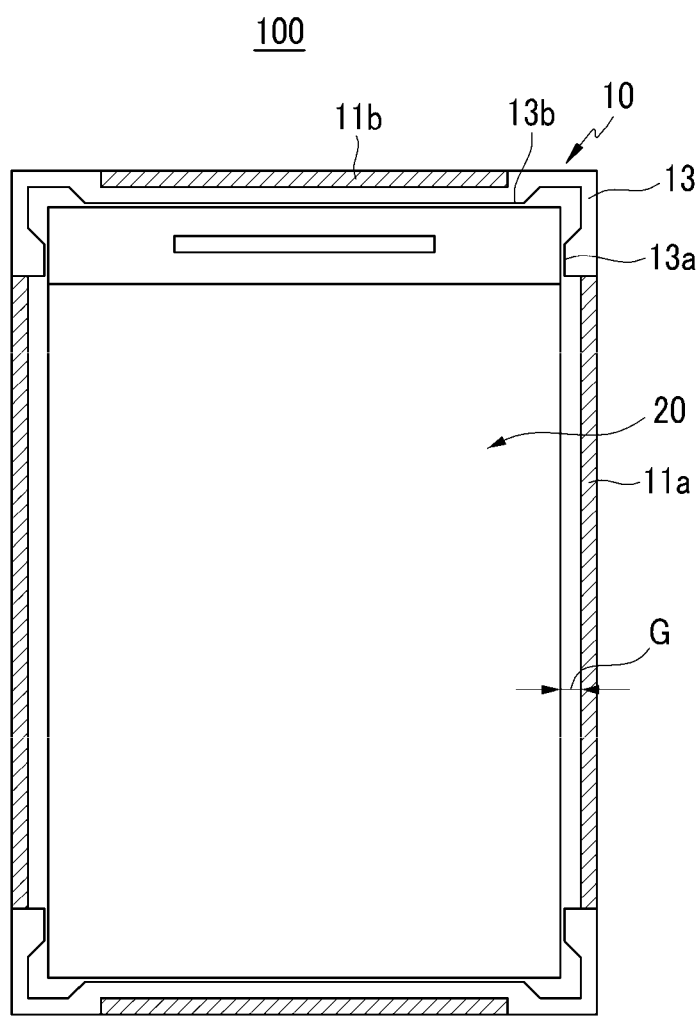
FIG. 3 is a top plan view illustrating the LCD of FIG. 1.

FIG. 2 is a top plan view illustrating the frame 10, and FIG. 3 is a top plan view illustrating a state where the LCD display panel 20 is inserted into the frame 10. Referring to FIG. 2, the frame 10 includes a molding 13 and support members 11 disposed in the molding 13. The support members 11 are formed with a metal such as steel use stainless (SUS), steel, chromium, and nickel, to support the molding 13 and strengthen the frame 10, thereby protecting a liquid crystal display panel. Further, the support members 11 are integrated into the molding 13, which is formed by an injection molding process. The molding 13 is made of, for example, a shock-absorbing material such as polycarbonate (PC), having a relatively lighter weight and greater elasticity than the support members 11.

The support members 11 include opposing first support members 11a, and opposing second support members 11b, which extend along respective sides of the frame 10. In the present exemplary embodiment, in order to reduce the thickness of the LCD 100, the molding 13 does not extend lengthwise along the inner and outer surfaces of the first support members 11a. That is, the first support members 11a have exposed inward and outward facing surfaces that are not covered by the molding 13. However, according to some embodiments, the molding 13 may extend lengthwise along edges of the support members 11a, or in some cases, may not extend lengthwise along the first support members 11a, in other aspects.

If the liquid crystal display panel 20 directly contacts the first support members 11a, during in an insertion process of the liquid crystal display panel 20, a burr may occur. Even after the liquid crystal display panel 20 is inserted, as the liquid crystal display panel 20 contacts the first support members 11a, the liquid crystal display panel 20 may be weakened or damaged. Therefore, in the present exemplary embodiment, the molding 13 includes a first guide unit 13a and a second guide unit 13b, which separate the liquid crystal display panel 20 from the support members 11. Accordingly, the liquid crystal display panel 20 contacts the molding 13, which is formed of a material having greater elasticity than the support members 11.

The first guide unit 13a is formed at opposing ends of the first support members 11a and extends inwardly from the frame 10. The first guide unit 13a is formed to protrude inwardly further than the first support members 11a. Further, the second guide unit 13b is formed to cover inward facing surfaces of the second support members 11b.

In the present exemplary embodiment, the first guide unit 13a includes inwardly protruding portions of the molding 13. Innermost surfaces of the first guide unit 13a (protrusions) are disposed further inside the frame 10 than the first support members 11a. Thus, when the liquid crystal display panel 20 is inserted into the frame 10, the liquid crystal display panel 20 contacts the first guide unit 13a rather than the support members 11a. Further, the second guide unit 13b includes stepped portions of the molding 13 that cover inwardly facing surfaces of the second support members 11b. Thus, when the liquid crystal display panel 20 is inserted into the frame 10, the liquid crystal display panel 20 contacts the second guide unit 13b rather than the second support members 11b.

Referring to FIG. 3, the liquid crystal display panel 20 is disposed inside the frame 10, so as to contact the first guide unit 13a and the second guide unit 13b. As described above, because the first guide unit 13a and the second guide unit 13b are made of the same material as the rest of the molding 13, which is a shock-absorbing material having a high elasticity, such as a polycarbonate, the portions of the liquid crystal display panel 20 contacting the guide units 13a, 13b are protected from being damaged.

The corners of the liquid crystal display panel 20 are relatively weak, and can be easily broken by contact with the frame 10, such as when external impacts/vibrations are applied to the frame 10. However, in the present exemplary embodiment, recesses are formed between adjacent portions of the first guide unit 13a and the second guide unit 13b, to house the corners, as shown in FIGS. 2 and 3. Accordingly, the corners of the liquid crystal display panel 20 do not contact the frame 10, thereby protecting the corners from being broken.

As shown in FIG. 3, the liquid crystal display panel 20 is separated from the first support members 11a by a gap G. In this case, the gap G may be from about 0.1 mm to about 0.3 mm. If the gap G is smaller than about 0.1 mm, the liquid crystal display panel 20 may contact the first support members 11a due to assembly errors. If the gap G is larger than about 0.3 mm, the size of the frame 10 may be increased unnecessarily. In the present exemplary embodiment, the range of the gap G is set according to the first support members 11a having a thickness of about 0.15 mm. However, the thickness of the first support members 11a and the size of the gap G can be modified according to a particular use purpose of the LCD 100.

In this way, the liquid crystal display panel 20 is separated from the first support members 11a by the gap G. Thus, the liquid crystal display panel 20 is not damaged by contact with the first support members 11a. Further, as the molding 13 is not formed on the inner surfaces of the first support members 11a, the thickness the frame 10 can be reduced, and thus, the LCD 100 can slim. Because the LCD 100 is assembled by insertion through the first guide unit 13a and the second guide unit 13b, it is unnecessary to use a separate jig. Thus, an assembly process of the LCD 100 is simple and fast.

Figure 4:
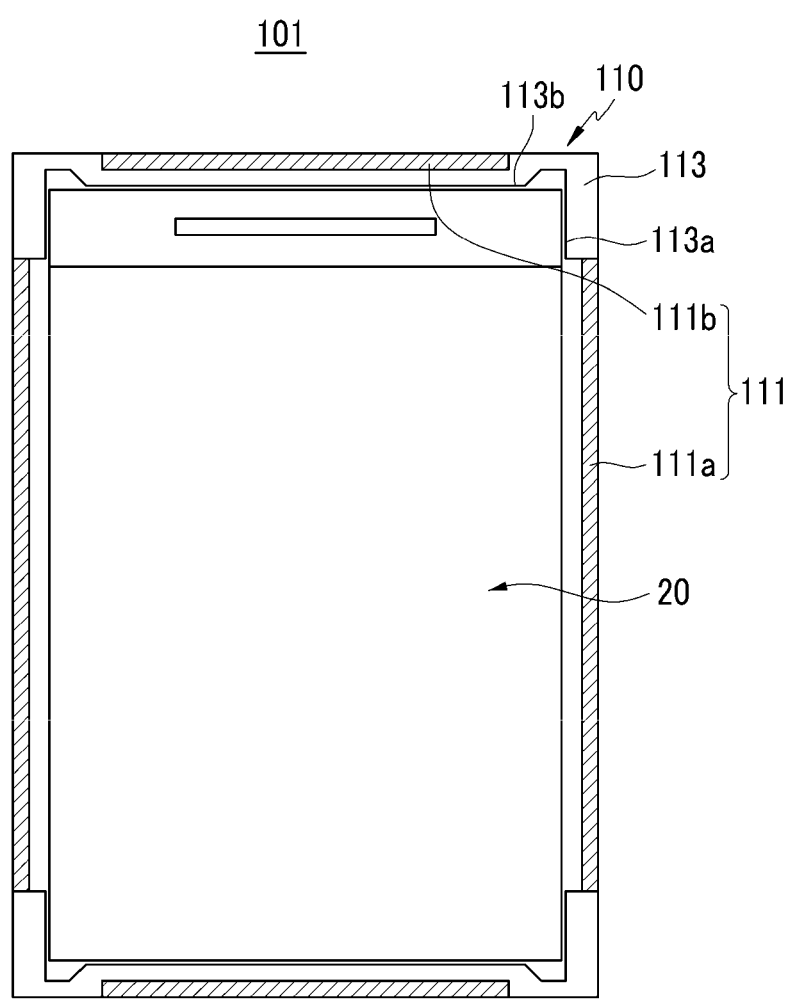
FIG. 4 is a top plan view illustrating an LCD, according to another exemplary embodiment.

FIG. 4 is a top plan view illustrating an LCD 101, according to a second exemplary embodiment. Referring to FIG. 4, the LCD 101 includes a liquid crystal display panel 20, a backlight unit, and a frame 110, as in the first exemplary embodiment. The frame 110 includes support members 111 and a molding 113, and the support members 111 includes opposing first support members 111a and opposing second support members 111b, which extend along corresponding sides of the frame 110. Further, the molding 113 includes a first guide unit 113a and a second guide unit 113b, to guide the insertion of the liquid crystal display panel 20 into the frame 110.

In this case, inward and outward facing surfaces of the first support members 111a are not covered by the molding 113. The first guide unit 113a includes projections of the molding 113 extending inwardly from opposing ends of the first support members 111a. The second guide unit 113b covers inwardly facing surfaces of the second support members 111b and projects toward the inside of the frame 110.

The innermost surfaces of the first guide unit 113a are disposed further inside of the frame 110 than the first support members 111a and are parallel to the innermost surfaces of the first support members 111a. Further, the innermost surfaces of the second guide unit 113b are dispose further inside of the frame 110 than, and extend parallel to, the second support members 111b.

As such, the flat inwardly facing surfaces of the first guide unit 113a provide a large contact surface for the liquid crystal display panel 20. Accordingly, the liquid crystal display panel 20 can be stably guided into the frame 110, and the frame 110 has a rigid structure that minimizes vibration, external impacts, etc.

Figure 5:
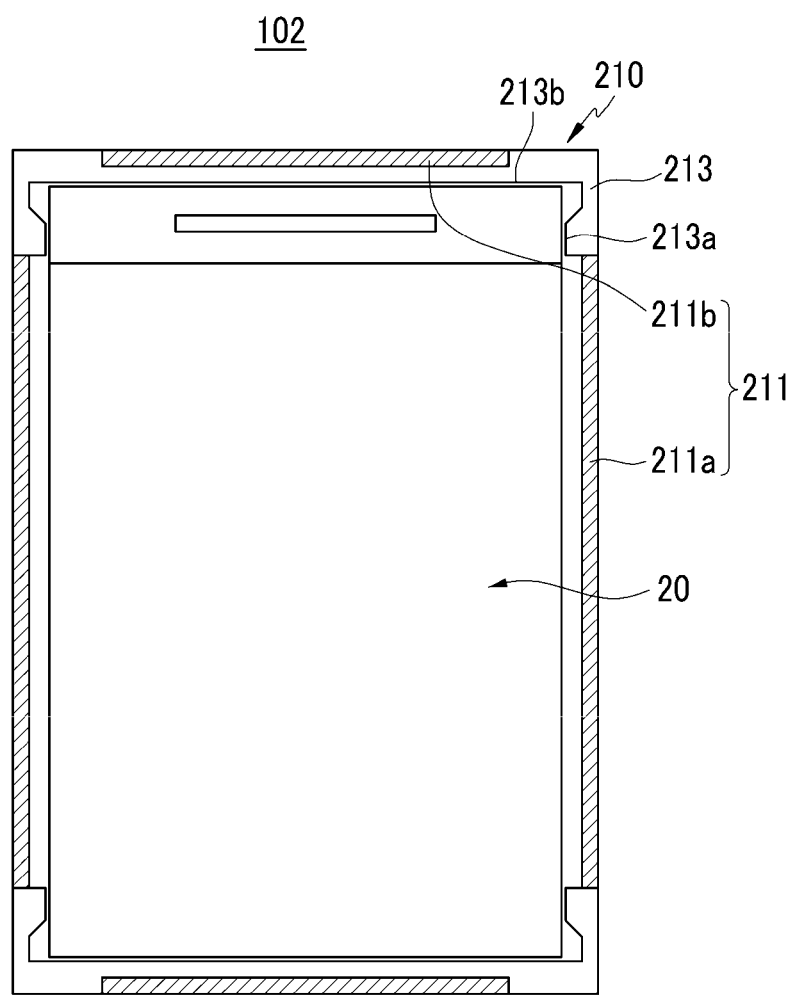
FIG. 5 is a top plan view illustrating an LCD, according to another exemplary embodiment.

FIG. 5 is a top plan view illustrating an LCD 102, according to a third exemplary embodiment. Referring to FIG. 5, the LCD 102 includes a liquid crystal display panel 20, a backlight unit, and a frame 210, as in the first exemplary embodiment. The frame 210 includes support members 211 and a molding 213, and the support members 211 include first support members 211a that is formed opposite at both side surfaces of the frame 210, and second support members 211b that extend generally orthogonally to the first support members 211a. Further, the molding 213 includes a first guide unit 213a and a second guide unit 213b that guide the insertion of the liquid crystal display panel 20 into the frame 210.

In this case, the first support members 211a have inwardly and outwardly facing surfaces that are not covered by the molding 213. The first guide unit 213a includes protrusions that extend toward the inside of the frame 210 and are disposed at opposing ends of the first support members 211a. The second guide unit 213b covers inwardly facing surfaces of the second support members 211b.

The first guide unit 213a includes planar surfaces that are disposed further inside the frame 210 than the first support members 211a. The planar surfaces extend parallel to the inwardly facing surfaces of the first support members 211a. The second guide unit 213b includes stepped portions the molding 213 that cover, and are parallel to, the inwardly facing surfaces of the second support members 211b.

Accordingly, when the liquid crystal display panel 20 is inserted into the frame 210, opposing edges of the liquid crystal display panel 20 and the second guide unit 213b have large contact areas. Accordingly, the liquid crystal display panel 20 can be stably guided by the frame 210, and the frame 210 has a rigid structure with regard to vibration, external impacts, etc.

Although a few exemplary embodiments of the present disclosure have been shown and described, it would be appreciated by those skilled in the art that changes may be made in these exemplary embodiments, without departing from the principles and spirit of the invention, the scope of which is defined in the claims and their equivalents.

What is claimed is:
1. A liquid crystal display (LCD) comprising:
an LCD panel;

a backlight unit comprising a light source and a light guide plate that diffuses light emitted from the light source; and a frame that houses the LCD panel and the backlight unit, comprising:
   a molding made of shock-absorbing material;
   first support members made of less elastic material than the molding and integrated into the molding so as to partially form opposing sides of the frame thereby supporting the molding and strengthening the frame; and
   a first guide unit including protrusions of the molding toward the inside of the frame, wherein the first guide unit contacts the first support members and contacts the LCD panel to prevent the LCD panel from contacting the first support members.

2. The LCD of claim 1, wherein the molding is not formed between the LCD panel and surfaces of the first support members that face the LCD panel.

3. The LCD of claim 1, wherein the protrusions are disposed at opposing ends of the first support members.

4. The LCD of claim 1, wherein inward facing surfaces of the first guide unit are planar and extend parallel to inward facing surfaces of the first support members.

5. The LCD of claim 1, wherein the frame further comprises:
   second support members integrated into the molding that extend generally perpendicular to the first support members; and
   a second guide unit that covers inward facing surfaces of the second support members,
   wherein edges of the LCD panel contact the second guide unit.

6. The LCD of claim 5, wherein the second guide unit comprises stepped projections that cover the inward facing surfaces of the second support members.

7. The LCD of claim 5, wherein inward facing surfaces of the second guide unit extend parallel to the inward facing surfaces of the second support members.

8. The LCD of claim 1, wherein the distance between the first support members and the LCD panel is from about 0.1 mm to about 0.3 mm.

9. The LCD of claim 1, wherein
   the first support members comprise one of steel use stainless (SUS), steel, chromium, and nickel, and
   the first guide unit comprises a polycarbonate (PC).

10. The LCD of claim 5, wherein
    the second support members comprise one of steel use stainless (SUS), steel, chromium, and nickel, and
    the second guide unit comprises a polycarbonate (PC).

11. The LCD of claim 1, further comprising an optical sheet that is formed between the LCD panel and the backlight unit.

12. The LCD of claim 1, further comprising a reflection sheet to reflect light from the backlight unit toward the LCD panel.

13. A liquid crystal display (LCD) comprising:
    an LCD panel;
    a backlight unit comprising a light source and a light guide plate that diffuses light emitted from the light source; and
    a frame that houses the LCD panel and the backlight unit, the frame comprising:
       first support members made of metal, wherein the first support members partially form first opposing sides of the frame;
       second support members that extend generally perpendicular to the first support members and partially form second opposing sides of the frame; and
       a molding made of shock-absorbing material and that exposes surfaces of the first support members facing the LCD panel and covers the second support members, the molding comprising a first guide unit that includes projections and partially form the frame, contact the first support members and contact the LCD panel to prevent the LCD panel from contacting the first support members,
       wherein the first support members and the second support members are integrated into the molding so as to support the molding and strengthen the frame.

14. The LCD of claim 13, wherein outermost surfaces of the second support members are coplanar with outermost surfaces of the molding.

15. The LCD of claim 13, wherein the molding further comprises
    a second guide unit that comprises stepped portions of the molding that cover the second support members and project inside the frame; and
    an empty space is formed between adjacent ones of the first and second guide units, such that the corners of the LCD panel do not contact the frame.

* * * * *